(12) United States Patent
O'Donnell et al.

(10) Patent No.: US 7,446,781 B2
(45) Date of Patent: *Nov. 4, 2008

(54) COMPOSITING TWO-DIMENSIONAL AND THREE-DIMENSIONAL IMAGE LAYERS

(75) Inventors: Daniel O'Donnell, Seattle, WA (US); James Acquavella, Seattle, WA (US); David P. Simons, Lynnfield, MA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/490,667

(22) Filed: Jul. 21, 2006

(65) Prior Publication Data

US 2006/0256136 A1      Nov. 16, 2006

Related U.S. Application Data

(63) Continuation of application No. 10/900,752, filed on Jul. 27, 2004, now Pat. No. 7,102,652, which is a continuation of application No. 09/970,157, filed on Oct. 1, 2001, now Pat. No. 6,809,745.

(51) Int. Cl.
*G06T 15/00* (2006.01)
*G09G 5/00* (2006.01)

(52) U.S. Cl. .......... 345/629; 345/634; 345/636
(58) Field of Classification Search ............ 345/4, 345/5, 6, 629, 634, 636, 419
See application file for complete search history.

(56) References Cited

U.S. PATENT DOCUMENTS

| 6,016,150 | A | | 1/2000 | Lengyel et al. | |
|---|---|---|---|---|---|
| 6,028,583 | A | * | 2/2000 | Hamburg | 345/629 |
| 6,314,211 | B1 | * | 11/2001 | Kim et al. | 382/285 |
| 6,466,210 | B1 | * | 10/2002 | Carlsen et al. | 345/629 |

* cited by examiner

*Primary Examiner*—Xiao M. Wu
*Assistant Examiner*—David H Chu
(74) *Attorney, Agent, or Firm*—Fish & Richardson P.C.

(57) ABSTRACT

Systems, methods and apparatus, including computer program products, implementing and using techniques for generating a composite image from both two-dimensional (2D) image layers and three-dimensional (3D) image layers. In one embodiment, the image layers are arranged in a sequence. The image layers are rendered according to the sequence to generate a composite image, the last image layer of the sequence to be rendered being a 2D image layer.

48 Claims, 3 Drawing Sheets

COMPOSITING TWO-DIMENSIONAL AND THREE-DIMENSIONAL IMAGE LAYERS

CROSS-REFERENCE TO RELATED APPLICATIONS

This application is a continuation application of, and claims priority to, U.S. patent application Ser. No. 10/900,752, which was filed on Jul. 27, 2004, now U.S. Pat. No. 7,102,652 which is a continuation of U.S. patent application Ser. No. 09/970,157, entitled Compositing Two-Dimensional And Three-Dimensional Images, to inventors Daniel O'Donnell et al., which was filed on Oct. 1, 2001 now U.S. Pat. No. 6,809,745.

BACKGROUND

This invention relates to compositing two-dimensional (2D) and three-dimensional (3D) images in graphical image manipulation systems.

A graphical image manipulation application program, such as Photoshop® or After Effects®, from Adobe Systems Incorporated, of San Jose, Calif., can store a graphical image as a set of image layers. A final image can be generated by compositing the image layers together. The image layers can be thought of as stacked transparency sheets. The density of ink on a transparency sheet controls the extent to which the sheet obscures underlying sheets. In the computer program, the color and density of the ink on the transparency sheet are represented by a color value and an opacity (or "alpha") value, respectively.

A conventional graphical image document includes a set of image layers, commonly denoted as layers 1, 2, . . . , n, that are organized in a layer stack. The bottom layer, that is, layer 1, acts as the background or bottom sheet, whereas the other layers, i.e., layers 2, 3, . . . , n, act as the transparency sheets that are overlaid on the background. Examples of different types of layers that may be included in a composite image include image layers, track mattes and adjustment layers.

An image layer typically includes an image that is represented by an array of pixels, each pixel having a color and, optionally, an opacity. The layers can either be two-dimensional (2D) or three-dimensional (3D). A 2D image layer does not have any depth, and can only be moved along the horizontal (X) and vertical (Y) directions and rotated around the (Z) axis. A 3D image layer, on the other hand, has an associated depth coordinate (Z), defining its position along a depth axis. A 3D image layer can typically be manipulated in 3D space through rotation, translation and scaling operations, which allows the 3D layers to display more realistic depictions of how they reflect light, cast shadows, and move through space. 2D and 3D layers are typically differentiated by a tag that identifies the type of layer. Based on the type of layer, the application typically allows a user to perform a different set of operations on the layers.

A track matte is a layer whose alpha channel, that is, opacity, at each pixel is used to specify the transparency of another layer, or of the track matte itself. Track mattes can be animated over time. Like image layers, track mattes can be either 2D or 3D layers and can be treated in corresponding ways including rotation, translation, and scaling.

An adjustment layer is a layer in which effects can be stored and applied to multiple layers. The adjustment layer itself is not visible, but its effects are visible. Any effects applied to an adjustment layer affect all layers below the adjustment layer in the composition stacking order. Thus, placing an adjustment layer at the bottom of the stacking order does not have any effect.

The process of stacking layers to form a final image is known as compositing. A list of layers that are to be composited together is known as a composition. In a 2D environment, the layers are composited in order from bottom to top. Since different layers may have different transparency values, the stacking order of the layers may be important. A composite image with layers ordered from 1 to n, will often look different from a composite image in which the layers are ordered from n to 1. In a 3D environment, the order is determined by the geometry in that the 3D layer that is the "farthest away" from the viewpoint gets rendered first. In other words, what is important in both situations is the order in which the layers are processed during the compositing process.

Conventionally, the compositing process begins by calculating any dynamic data in the image layer, such as the color of the pixels in the image. Then the opacity of each pixel is determined. Finally, the color of each pixel in the image layer is combined with the composited color of the corresponding pixel in an output buffer where the final image is stored to generate a new composited color. This process is iterated for each layer until all the layers have been composited, thus generating the final image.

In many situations a user wishes to combine 2D and 3D objects in a scene. Conventionally, there are three ways this can be done. First, the 2D element (that is, the 2D layer) can be used as a background image. The background image is applied to the output buffer first and any 3D objects are composited in front of the background image. Second, the 2D image can be treated as a texture map, that is, a surface with a particular structure. The texture map is "glued" onto a portion of a plane in a 3D layer and the plane can then be manipulated in 3D space. Third, the 3D layers can be composited together into a temporary image buffer, which is then composited with one image buffer that contains 2D elements.

In all these methods, the 3D images are processed separately from the 2D images, in that the 2D images either are pre-processed, post-processed, or treated as if they were 3D geometry. From a workflow point of view, this is cumbersome for a user. A typical task for a user is to place titles or other types of text (that is, a 2D element) in a 3D scene. The user may wish to place the title in front of a 3D image, behind a 3D image, or between two 3D images. The pre-processing method (i.e. the first method) presented above does not allow 2D images to be placed in front of a 3D images. The post-processing method (that is, the third method) requires that the 2D image always be placed in front of the 3D image. The second method, in which the 2D images are treated as texture maps on 3D images, may work but presents difficulties in terms of aligning the plane on which the 2D image is placed to the 3D camera (that is, the projection of the composite image that is displayed to a user) and correctly scaling the geometry in order to achieve the desired image size. Furthermore, none of the methods presented above allows mixing track mattes or adjustment layers with image layers of a different dimensionality, such as mixing a 3D adjustment layer with a 2D image layer.

SUMMARY

In general, in one aspect, this invention provides systems, methods and apparatus, including computer program products, implementing and using techniques for generating a composite image. Electronic data representing at least three image layers to be combined in a composite image is provided. At least one of the image layers has two-dimensional content and at least one of the image layers has three-dimensional content. The layers are arranged in a sequence represented by a composition sequence list. The at least three image layers are grouped into at least three metalayers, each of the metalayers including one or more image layers having content having a common dimensionality such that each image layer that is adjacent to an image layer having a common dimensionality is grouped in the same metalayer as that image layer. The metalayers are arranged in a metalayer sequence. A metalayer is selected according to the metalayer sequence and the image layers in the selected metalayer are processed to generate a raster representation of the image layers in the selected metalayer. The raster representation is composited into an image buffer until the raster representation of each of the metalayers has been composited into the image buffer to form a composite image.

Advantageous implementations can include one or more of the following features.

Grouping the image layers can include sorting adjacent image layers with two-dimensional content into a two-dimensional bin and adjacent image layers with three-dimensional content into a three-dimensional bin. Visual parameters for the three-dimensional image layers can be stored in a global visual parameter list. Processing the image layers can include selectively applying the stored visual parameters to the image layers in the metalayer. The visual parameters can apply to all image layers that have already been processed according to the metalayer sequence. The stored visual parameters can be selectively applied such that the two-dimensional content is unaffected by the visual parameters. The visual parameters include one or more of camera position, light effects and shadow effects. The metalayer sequence can correspond to the composition sequence list.

Grouping the image layers can include selecting a current image layer in the composition sequence list, determining the dimensionality of the content in the current image layer, and determining the dimensionality of the content in a previous, adjacent image layer. If there is no previous, adjacent image layer, or if the dimensionality of the content in the current image layer is different from the previous adjacent image layer, a new metalayer can be created for image layers having content of the current image layer's dimensionality and the current image layer can be added to the metalayer. If the dimensionality of the content in the current image layer is the same as the dimensionality of the content in the previous adjacent image layer, the current image layer can be added to the metalayer of the previous, adjacent image layer.

Grouping the image layers can include determining if the current image layer is an adjustment layer or a track matte and skipping the current image layer and selecting the next image layer in the composition sequence list if the current image layer is an adjustment layer or a track matte. Processing the image layers can include processing two-dimensional metalayers with a two-dimensional renderer and processing three-dimensional metalayers with a three-dimensional renderer. The raster representations can be sequentially composited into the same image buffer.

Processing the image layers can include determining for each image layer in the metalayer whether the image layer has an associated adjustment layer and applying the adjustment layer to the current and previously processed image layers if the image layer has an associated adjustment layer. Applying the adjustment layer can include processing the adjustment layer to generate a raster representation of the adjustment layer if the adjustment layer is a three-dimensional adjustment layer, and applying the raster representation of the adjustment layer to the raster representations of the associated image layers.

Processing the image layers can include determining for each image layer in the metalayer whether the image layer has an associated track matte and if the image layer has an associated track matte, applying the track matte to the current and previously processed image layers. If the track matte is a three-dimensional track matte, the track matte can be processed to generate a raster representation of the track matte and the raster representation of the track matte can be applied to the raster representations of the associated image layers.

In general, in another aspect, this invention provides systems, methods and apparatus, including computer program products, implementing and using techniques for generating a composite image. Electronic data representing at least three image layers to be combined in a composite image is provided. Each of the image layers includes two-dimensional content or three-dimensional content and the image layers are arranged in a composition sequence. The image layers are grouped to form at least three metalayers. Each metalayer includes a set of one or more image layers such that the set of image layers in a given metalayer are adjacent in the composition sequence and have a common dimensionality. The metalayers are arranged in a metalayer sequence such that each metalayer is adjacent in the metalayer sequence to one or more metalayers comprising image layers of a different dimensionality. The metalayers are processed to generate a composite image comprising at least a portion of the two-dimensional content and at least a portion of the three-dimensional content, and one or more visual effects are applied to the composite image, such that the two-dimensional content is unaffected by the visual effects.

The invention can be implemented to realize one or more of the following advantages. 2D and 3D layers can be placed in any order in one composition, and do not need to be placed in a fixed, predetermined order, as is the case with prior art image systems. There is no need to treat 2D images as texture maps on planes as is the case with conventional image applications. This provides greater artistic freedom to a user compared to conventional applications. Furthermore, less memory is used and faster processing can be accomplished. In the conventional methods, a user must intervene manually, for example, to create a texture map, to align the plane with the camera, and to scale the geometry, as was described above. The inventive method does not require any manual user interaction of this type and is therefore more user-friendly and less prone to errors than the current methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
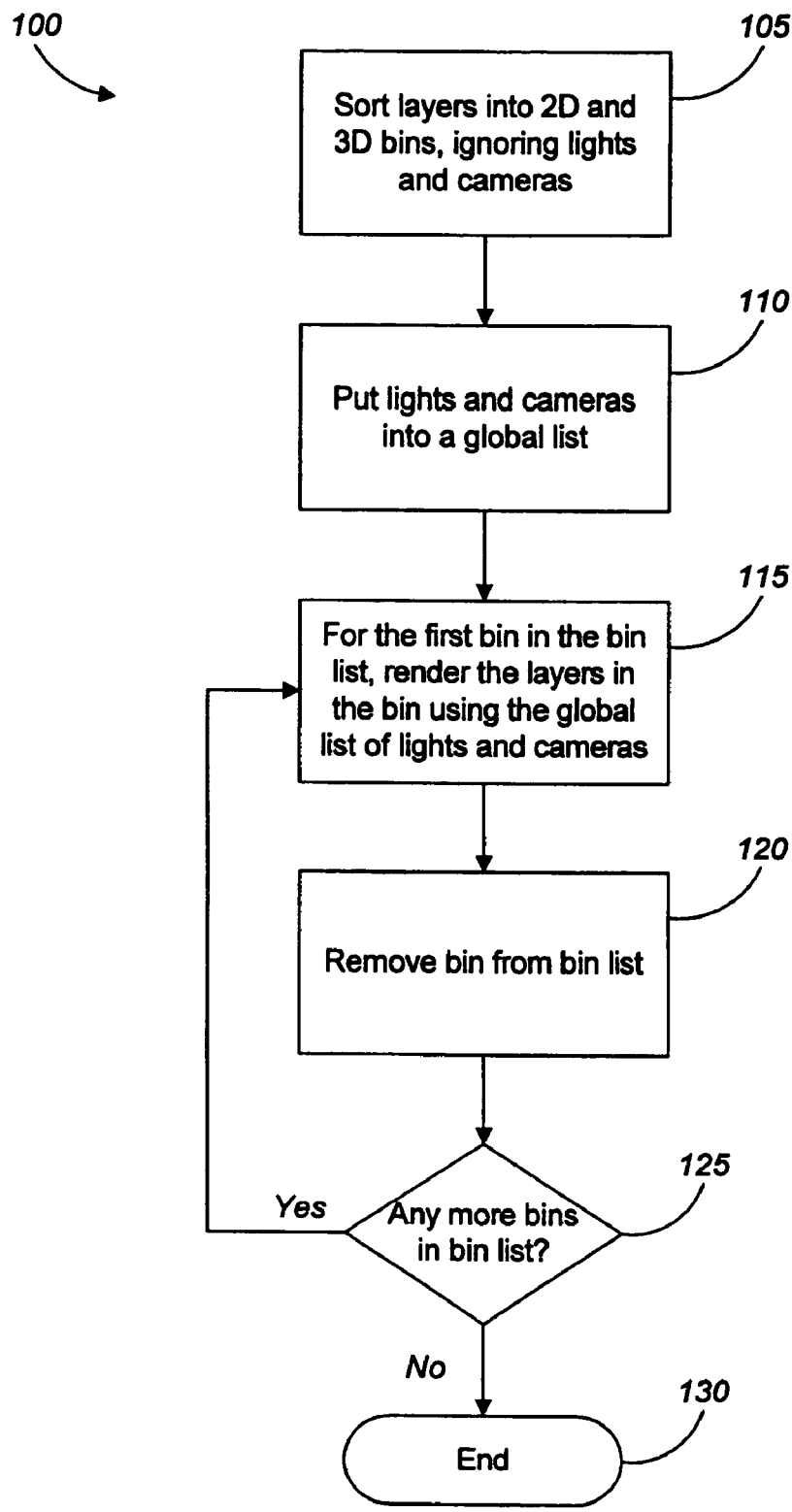
FIG. 1 is a flowchart showing a process for compositing 2D and 3D objects into an image.

As shown in FIG. 1, a process (100) for compositing 2D and 3D layers into a composite image starts with sorting the layers of a composition into 2D bins and 3D bins (105). The bins do not have any dimensionality, but are named after the type of layers they contain. The bins can be represented in a number of ways and are primarily used in this example as a conceptual way to group layers of the same type. The layer sequence is maintained as a separate list both before and after the sorting of the layers.

The sorting (105) will now be explained by way of example. Assume that the layer sequence contains (from top to bottom) two 3D layers, two 2D layers and two additional 3D layers. The process first looks at the first layer (the bottom layer) in the layer sequence and reads the tag associated with this layer. When the process recognizes the layer as a 3D layer, the process creates a first 3D bin and puts the bottom 3D layer into the 3D bin. The process then looks at the second layer from the bottom in the layer sequence, which is another 3D layer, and puts this second 3D layer into the first 3D bin as well. The third layer in the layer sequence is a 2D layer. The process therefore creates a first 2D bin and puts the 2D layer into the first 2D bin. The fourth layer from the bottom of the layer sequence is another 2D layer and gets put into the first 2D bin. The fifth layer from the bottom is a 3D layer. This 3D layer does not get put in the first 3D bin together with the other 3D layers, but instead a second 3D bin is created and the fifth layer gets put into this second 3D bin. Finally, the last 3D layer, the top of the layer sequence, gets put into the second 3D bin. The result of the sorting is thus a set of 2D bins and 3D bins, where each bin contains a number of consecutive layers of the same type.

As the bins are created, they are added to a bin list, so that at the end of the sorting there is both a layer sequence list containing the layer sequence, independently of which bin the respective layers belong to, and a bin list containing the order in which the bins were created. The bins can also be thought of as "metalayers," where each "metalayer" corresponds to one or more "real" layers. In this terminology the bin list can be referred to as a metalayer sequence.

During the sorting step, the process also checks if a layer is an adjustment layer or a track matte. If either of these layer types are found, the process checks what image layer the adjustment layer or track matte is associated with and notes this as a property of the associated layer. The adjustment layer or track matte is not sorted into any bin, but will instead be used during the rendering of the bins, as will be described below.

As was described in the background section, each 3D layer has associated camera and lights information, while 2D layers do not have these properties. The camera function allows a user to view one or more 3D layers in a composition as if the user were looking at the layers through a camera, including angles, distances, and so on. The lights information allows a user to create lights in one or more 3D layers that can, if the user desires, shine on other 3D layers that were sorted into the same bin. The lights can be parallel light rays, spot lights, point lights, and so on. When the process sorts the 2D and 3D layers, the lights and camera information is not grouped into any bins but instead put into a global list (110) that can be accessed by all the 3D bins when the bins are rendered, as will be seen below.

The layer need not be a single layer, but may alternatively be composed of several sublayers. In one implementation, if the process discovers a layer that includes sublayers, the process can sort the sublayers into bins that are placed in the same bin list as the regular layers, thereby "converting" the sublayers into regular layers. In another implementation, the sublayers are composited in a similar way to what is described here, to yield a composite image that is treated as a single 2D or a 3D layer by the sorting process. This composite 2D or 3D layer can be sorted into a 2D or 3D bin together with the other 2D or 3D layers, as described above.

After the layers have been sorted into 2D and 3D bins and the camera and lights information has been stored in a global list, or alternatively maintained in the list of the original layer sequence, the process renders the layers in accordance with the layer sequence (115). The process first renders the layers in the first bin in the bin list, which in the example above is the first 3D bin, then the layers in the second bin in the bin list (that is, the first 2D bin) and finally the layers in the third bin in the bin list (that is, the second 3D bin). Each bin in the list is rendered separately, in the order in which the bins were created. A 2D renderer is used to render the 2D layers in the 2D bin and a 3D renderer is used to render the 3D layers in the 3D bins. The layers are rendered using conventional techniques for 2D and 3D rendering, examples of which can be found in "Fundamentals of Computer Graphics," second edition, by James D. Foley, Andries van Dam et al., Addison-Wesley Publishing Company, 1997.

When the layers in a 3D bin are rendered, the lights and camera information is obtained from the global list and used by the 3D renderer. The same lights and camera information may be applied to all 3D layers in all 3D bins to generate a uniform appearance for all 3D layers, but if the global list contains varying camera and lights information, a user can choose to apply different lights and camera information to different layers, or no camera and lights information to some layers, in order to achieve various artistic effects.

Furthermore, for each layer that is rendered, the process checks if the layer has any associated track mattes or adjustment layers. If the layer has any associated track mattes or adjustment layers, these will be rendered simultaneously with the layer. If the dimensionality of the track matte or adjustment layer is different from the dimensionality of the image layer, that is, a 2D track matte is applied to a 3D layer or a 3D track matte is applied to a 2D layer, a special rendering process is used to apply the track matte or adjustment layer, as will be described in further detail below, with reference to FIG. 2 and FIG. 3.

When the layers in a bin are rendered, the output from the renderer is placed in an image buffer. This image buffer is then used as input (for example, as a background layer onto which subsequent layers will be composited) for the layers in the next bin to be rendered. After the layers in a bin have been rendered, the bin is removed from the bin list (120) and the process checks if there are any more bins in the bin list (125). If the bin list is empty, the rendering is complete and the process ends (130). If there are more bins to render in the bin list, the process returns to step (115), using the image buffer as input to the renderer for the layers in the next bin and renders the next bin in the bin list, until all the bins have been rendered.

This rendering process allows for 2D layers to be placed between 3D layers, which cannot easily be done with conventional rendering techniques. The visual effect that is achieved by this process is that the 2D layers always face the 3D camera but are otherwise unaffected by the camera and lights. As a consequence of the rendering technique, 3D layers separated by a 2D layer do not interact. For example, a top group of 3D layers do not cast any shadows on a bottom group of 3D layers, if the two groups are separated by one or more 2D layers.

Figure 2:
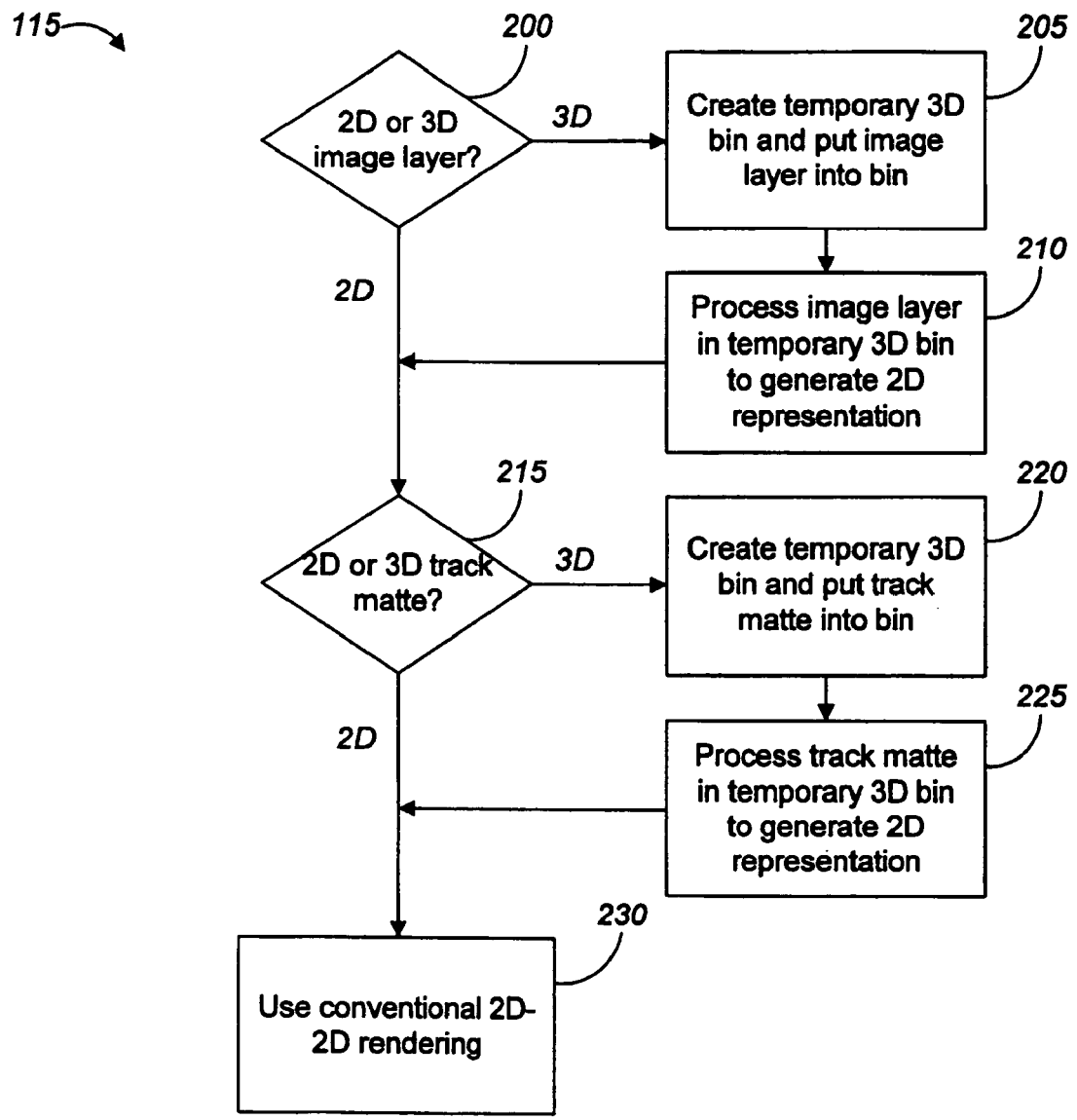
FIG. 2 is a flowchart detailing the rendering step in FIG. 1.

The rendering of track mattes with layers of mixed dimensions is shown in FIG. 2 and will now be explained. A track matte or adjustment layer can be either a 2D or a 3D layer and determines what sections of the underlying one or more layers are visible. A 3D image layer can be associated with a 2D track matte (or adjustment layer) and a 2D image layer can be associated with a 3D track matte (or adjustment layer). Conventional rendering methods can handle two-dimensional track mattes or adjustment layers applied to two-dimensional representations of 2D or 3D image layers, so any 3D track matte or 3D image layer first needs to be converted into a 2D representation. During the rendering step (115), the process therefore first examines if a 2D or a 3D image layer is being rendered (200). If the image layer is a 3D layer, the process creates a 3D bin and puts the 3D image layer into the bin (205). The 3D layer in the bin is then processed to generate a 2D representation (210) of the 3D layer, such as a raster image, that can be used in conventional 2D rendering (for example, compositing). After the 2D representation has been created, or if the image layer is a 2D layer, the process checks whether the associated track matte is a 2D track matte or a 3D track matte (215). If the track matte is a 3D track matte, the process creates a 3D bin and puts the 3D track matte into the bin (220). The 3D track matte in the bin is then processed to generate a 2D representation (225) of the 3D track matte, such as a raster representation, that can be used in conventional rendering. At this point, the 3D properties have been removed from both the image layer and the associated track matte and conventional 2D rendering can be used (230) to render the image layer with the associated track matte.

Figure 3:
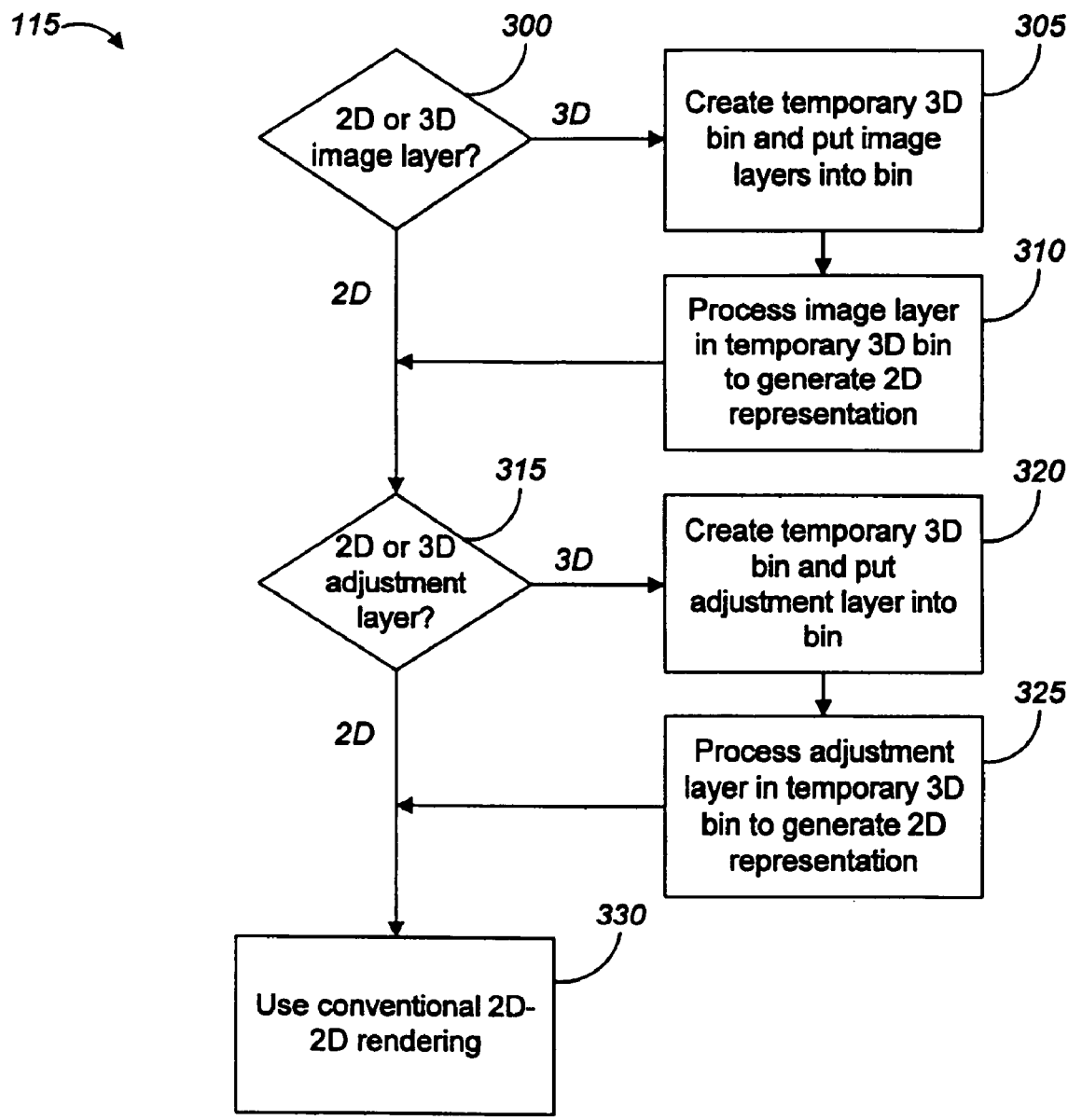
FIG. 3 is a flowchart detailing the rendering step in FIG. 1.

FIG. 3 describes a process similar to the process shown in FIG. 2 for rendering adjustment layers with layers of mixed dimensions. The process (115) performs the same steps, except that adjustment layers are involved instead of track mattes. Thus, where steps (215), (220), (225) involved track mattes, steps (315), (320), (325) involve adjustment layers. A consequence of using adjustment layers is that all layers beneath the adjustment layer are affected, so step (205) therefore uses all layers to which the adjustment layer is applied. For 2D image layers, all the layers beneath the adjustment layer are all the layers below the adjustment layer in the composition sequence. For 3D image layers, all the layers beneath the adjustment layer are the 3D layers in the same bin as the adjustment layer and that are located behind the adjustment layer.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
a programmable processor; and
a computer-readable medium comprising a computer program product for generating a composite image, the computer program product comprising instructions operable to cause the programmable processor to:
provide electronic data representing at least three image layers to be combined in a composite image, at least one of the image layers having two-dimensional content and at least one of the image layers having three-dimensional content, the layers being arranged in a sequence represented by a composition sequence list;
group the at least three image layers into at least three metalayers, each of the metalayers including one or more image layers having content having a common dimensionality such that each image layer that is adjacent to an image layer having a common dimensionality is grouped in the same metalayer as that image layer, the metalayers being arranged in a metalayer sequence; and
select a metalayer from among the metalayers according to the metalayer sequence and process the image layers in the selected metalayer to generate a raster representation of the image layers in the selected metalayer and composite the raster representation into an image buffer until the raster representation of each of the metalayers has been composited into the image buffer to form a composite image.

2. The system of claim 1, wherein the instructions operable to cause the programmable processor to group the image layers comprise instructions operable to cause the programmable processor to sort adjacent image layers with two-dimensional content into a two-dimensional bin and adjacent image layers with three-dimensional content into a three-dimensional bin.

3. The system of claim 1, further comprising instructions operable to cause the programmable processor to:
store visual parameters for the three-dimensional image layers in a global visual parameter list.

4. The system of claim 3, wherein the instructions operable to cause the programmable processor to process the image layers further comprise instructions to cause the programmable processor to selectively apply the stored visual parameters to the image layers in the metalayer.

5. The system of claim 4, wherein the visual parameters apply to all image layers that have already been processed according to the metalayer sequence.

6. The system of claim 3, further comprising instructions operable to cause the programmable processor to selectively apply the stored visual parameters such that the two-dimensional content is unaffected by the visual parameters.

7. The system of claim 3, wherein the visual parameters include one or more of: camera position, light effects and shadow effects.

8. The system of claim 1, wherein the metalayer sequence corresponds to the composition sequence list.

9. The system of claim 1, wherein the instructions operable to cause the programmable processor to group the image layers comprise instructions operable to cause the programmable processor to:
select a current image layer in the composition sequence list; determine the dimensionality of the content in the current image layer;
determine the dimensionality of the content in a previous, adjacent image layer, if there is no previous, adjacent image layer, or if the dimensionality of the content in the current image layer is different from the previous adjacent image layer, create a new metalayer for image layers having content of the current image layer's dimensionality and add the current image layer to the metalayer; and
if the dimensionality of the content in the current image layer is the same as the dimensionality of the content in the previous adjacent image layer, add the current image layer to the metalayer of the previous, adjacent image layer.

10. The system of claim 9, wherein the instructions operable to cause the programmable processor to group the image layers further comprise instructions operable to cause the programmable processor to:
determine if the current image layer is an adjustment layer or a track matte; and
skip the current image layer and select the next image layer in the composition sequence list if the current image layer is an adjustment layer or a track matte.

11. The system of claim 1, wherein the instructions operable to cause the programmable processor to process the image layers comprise instructions operable to cause the programmable processor to:

process two-dimensional metalayers with a two-dimensional renderer; and process three-dimensional metalayers with a three-dimensional renderer.

12. The system of claim 1, wherein the raster representations are sequentially composited into the same image buffer.

13. The system of claim 1, wherein the instructions operable to cause the programmable processor to process the image layers comprise instructions operable to cause the programmable processor to:

for each image layer in the metalayer, determine if the image layer has an associated adjustment layer, and if the image layer has an associated adjustment layer, apply the adjustment layer to the current and previously processed image layers.

14. The system of claim 13, wherein the instructions operable to cause the programmable processor to apply the adjustment layer comprise instructions operable to cause the programmable processor to:

if the adjustment layer is a three-dimensional adjustment layer, process the adjustment layer to generate a raster representation of the adjustment layer; and apply the raster representation of the adjustment layer to the raster representations of the associated image layers.

15. The system of claim 1, wherein the instructions operable to cause the programmable processor to process the image layers comprise instructions operable to cause the programmable processor to:

for each image layer in the metalayer, determine if the image layer has an associated track matte; and if the image layer has an associated track matte, apply the track matte to the current and previously processed image layers.

16. The system of claim 15, further comprising instructions operable to cause the programmable processor to:

if the track matte is a three-dimensional track matte, process the track matte to generate a raster representation of the track matte; and apply the raster representation of the track matte to the raster representations of the associated image layers.

17. A system comprising:

a programmable processor; and a computer-readable medium comprising a computer program product for generating a composite image, the computer program product comprising instructions operable to cause the programmable processor to:

provide electronic data representing at least three image layers to be combined in a composite image, each of the image layers comprising two-dimensional content or three-dimensional content, the image layers being arranged in a composition sequence;

group the image layers to form at least three metalayers, each metalayer comprising a set of one or more image layers such that the set of image layers in a given metalayer are adjacent in the composition sequence and have a common dimensionality, the metalayers being arranged in a metalayer sequence such that each metalayer is adjacent in the metalayer sequence to one or more metalayers comprising image layers of a different dimensionality;

process the metalayers to generate a composite image comprising at least a portion of the two-dimensional content and at least a portion of the three-dimensional content; and apply one or more visual effects to the composite image, such that the two-dimensional content is unaffected by the visual effects.

18. A system comprising:

a programmable processor; and a computer-readable medium comprising a computer program product for generating a composite image, the computer program product comprising instructions operable to cause the programmable processor to:

receive data representing image layers to be combined in a composite image, at least one of the image layers being a two-dimensional (2D) image layer and at least two of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a three-dimensional space, the image layers being arranged in a sequence in which a top 3D image layer is separated from a bottom 3D image layer by a 2D image layer; and render the image layers according to the sequence to generate a composite image.

19. The system of claim 18, further comprising instructions operable to cause the programmable processor to apply one or more visual parameters in rendering the image layers, the visual parameters being applied only to 3D image layers, the rendering of the 2D layers in the sequence being unaffected by the visual parameters.

20. The system of claim 19, wherein the visual parameters include one or more of: camera position, light effects, and shadow effects.

21. The system of claim 18, wherein:

the 2D image layers in the sequence are rendered to face a 3D camera but are otherwise unaffected by the 3D camera or any lighting effects associated with any 3D image layer.

22. The system of claim 18, wherein each image layer in the sequence is either a 2D image layer or a 3D image layer, and wherein instructions operable to cause the programmable processor to render the image layers comprises instructions operable to cause the programmable processor to:

render each group of adjacent 2D image layers with a two-dimensional renderer; and render each group of adjacent 3D image layers with a three-dimensional renderer.

23. The system of claim 22, wherein:

the two-dimensional renderer and the three-dimensional renderer each generate a raster representation for each group of adjacent images; and each raster representation is sequentially composited into the same image buffer.

24. The system of claim 18, wherein the sequence of image layers includes two 2D image layers separated by at least one 3D image layer.

25. A system comprising:

a programmable processor; and a computer-readable medium comprising a computer program product for generating a composite image, the computer program product comprising instructions operable to cause the programmable processor to:

receive data representing image layers to be combined in a composite image, at least one of the image layers being a two-dimensional (2D) image layer and at least one of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a three-dimensional space, at least one of the image layers being associated with an adjustment layer, an adjustment layer being a layer that is not itself visible in which effects can be stored and applied to all layers below the adjustment layer in a composition stack, the image layers being arranged in a sequence;

render the image layers according to the sequence to generate a composite image, the instructions operable to cause the programmable processor to render comprising instructions operable to cause the programmable processor to:

for each current image layer being rendered, determine whether the current image layer has an associated adjustment layer with a dimensionality different from that of the current image layer, and if it does, apply the adjustment layer to an associated composition stack, the associated composition stack being the current and all previously processed image layers if the current image layer is a 2D image layer, the associated composition stack being the current and all previously processed adjacent 3D image layers if the current image layer is a 3D image layer.

26. The system of claim 25, wherein instructions operable to cause the programmable processor to apply the adjustment layer comprise instructions operable to cause the programmable processor to:

if the adjustment layer is a three-dimensional adjustment layer, process the adjustment layer to generate a raster representation of the adjustment layer; and apply the raster representation of the adjustment layer to the raster representations of the associated composition stack.

27. A system comprising:

a programmable processor; and a computer-readable medium comprising a computer program product for generating a composite image, the computer program product comprising instructions operable to cause the programmable processor to:

receive data representing image layers to be combined in a composite image, at least one of the image layers being a two-dimensional (2D) image layer and at least one of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a three-dimensional space, at least one of the image layers being associated with a track matte, a track matte being a layer whose opacity at each pixel specifies the transparency of another layer or of the track matte its elf render the image layers according to the sequence to generate a composite image, the instructions operable to cause the programmable processor to render comprising instructions operable to cause the programmable processor to:

for each current image layer being rendered, determine whether the current image layer has an associated track matte and at least one of the current image layers and the associated track matte is three-dimensional, and if so:

(i) process the track matte to generate a two-dimensional raster representation of the track matte, if the track matte is not a two-dimensional track matte, (ii) process the current image layer to generate a two-dimensional raster representation of the current image layer, if the current image layer is not a two-dimensional image layer, and then (iii) apply the track matte, if the track matte is two-dimensional, or the two-dimensional raster representation of the track matte, if the track matte is not two-dimensional, to either the current image layer, if the current image layer is two-dimensional, or to the two-dimensional raster representation of the current image layer, if the current image layer is not two-dimensional.

28. A computer-implemented method of generating a composite image, comprising:

receiving data representing image layers to be combined in a composite image, at least one of the image layers being a two-dimensional (2D) image layer and at least one of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a three-dimensional space, the image layers being arranged in a sequence; and rendering the image layers according to the sequence to generate a composite image, the last image layer of the sequence to be rendered being a 2D image layer.

29. The method of claim 28, further comprising:

applying one or more visual parameters in rendering the image layers, the visual parameters being applied only to 3D image layers, the rendering of the 2D layers in the sequence being unaffected by the visual parameters.

30. The method of claim 29, wherein the visual parameters include one or more of: camera position, light effects, and shadow effects.

31. The method of claim 28, wherein:

the 2D image layers in the sequence are rendered to face a 3D camera but are otherwise unaffected by the 3D camera or any lighting effects associated with any 3D image layer.

32. The method of claim 28, wherein each image layer in the sequence is either a 2D image layer or a 3D image layer, and wherein rendering the image layers comprises:

rendering each group of adjacent 2D image layers with a two-dimensional renderer; and rendering each group of adjacent 3D image layers with a three-dimensional renderer.

33. The method of claim 32, wherein:

the two-dimensional renderer and the three-dimensional renderer each generate a raster representation for each group of adjacent images; and each raster representation is sequentially composited into the same image buffer.

34. The method of claim 28, wherein the sequence of image layers includes two 2D image layers separated by at least one 3D image layer.

35. A computer program product, tangibly stored on a computer-readable medium, for generating a composite image, comprising instructions operable to cause a programmable processor to:

receive data representing image layers to be combined in a composite image, at least one of the image layers being a two-dimensional (2D) image layer and at least two of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a thee-dimensional space, the image layers being arranged in a sequence; and render the image layers according to the sequence to generate a composite image, the last image layer of the sequence to be rendered being a 2D image layer.

36. The computer program product of claim 35, further comprising instructions operable to cause the programmable processor to apply one or more visual parameters in rendering the image layers, the visual parameters being applied only to 3D image layers, the rendering of the 2D layers in the sequence being unaffected by the visual parameters.

37. The computer program product of claim 36, wherein the visual parameters include one or more of: camera position, light effects, and shadow effects.

38. The computer program product of claim 35, wherein:
the 2D image layers in the sequence are rendered to face a 3D camera but are otherwise unaffected by the 3D camera or any lighting effects associated with any 3D image layer.

39. The computer program product of claim 35, wherein each image layer in the sequence is either a 2D image layer or a 3D image layer, and wherein instructions operable to cause the programmable processor to render the image layers comprises instructions operable to cause the programmable processor to:
render each group of adjacent 2D image layers with a two-dimensional renderer; and
render each group of adjacent 3D image layers with a three-dimensional renderer.

40. The computer program product of claim 39, wherein:
the two-dimensional renderer and the three-dimensional renderer each generate a raster representation for each group of adjacent images; and
each raster representation is sequentially composited into the same image buffer.

41. The computer program product of claim 35, wherein the sequence of image layers includes two 2D image layers separated by at least one 3D image layer.

42. A system comprising:
a programmable processor; and
a computer-readable medium comprising a computer program product for generating a composite image, the computer program produce comprising instructions operable to cause the programmable processor to:
receive data representing image layers to be combined in a composite image, at least one of the image layers being a two-dimensional (2D) image layer and at least two of the image layers being a three-dimensional (3D) image layer, a 2D image layer being a layer that is subject only to manipulation in a two-dimensional space, a 3D image layer having an associated depth coordinate defining its position along a depth axis and being subject to manipulation in a three-dimensional space, the image layers being arranged in a sequence; and
render the image layers according to the sequence to generate a composite image, the last image layer of the sequence to be rendered being a 2D image layer.

43. The system of claim 42, further comprising instructions operable to cause the programmable processor to apply one or more visual parameters in rendering the image layers, the visual parameters being applied only to 3D image layers, the rendering of the 2D layers in the sequence being unaffected by the visual parameters.

44. The system of claim 36, wherein the visual parameters include one or more of: camera position, light effects, and shadow effects.

45. The system of claim 44, wherein:
the 2D image layers in the sequence are rendered to face a 3D camera but are otherwise unaffected by the 3D camera or any lighting effects associated with any 3D image layer.

46. The system of claim 42, wherein each image layer in the sequence is either a 2D image layer or a 3D image layer, and wherein instructions operable to cause the programmable processor to render the image layers comprises instructions operable to cause the programmable processor to:
render each group of adjacent 2D image layers with a two-dimensional renderer; and
render each group of adjacent 3D image layers with a three-dimensional renderer.

47. The system of claim 46, wherein:
the two-dimensional renderer and the three-dimensional renderer each generate a raster representation for each group of adjacent images; and
each raster representation is sequentially composited into the same image buffer.

48. The system of claim 42, wherein the sequence of image layers includes two 2D image layers separated by at least one 3D image layer.

* * * * *

UNITED STATES PATENT AND TRADEMARK OFFICE
CERTIFICATE OF CORRECTION

| | | |
|---|---|---|
| PATENT NO. | : 7,446,781 B2 | Page 1 of 1 |
| APPLICATION NO. | : 11/490667 | |
| DATED | : November 4, 2008 | |
| INVENTOR(S) | : Daniel O'Donnell, James Acquavella and David P. Simons | |

It is certified that error appears in the above-identified patent and that said Letters Patent is hereby corrected as shown below:

Claim 27:
    column 11, line 59:
        delete "it self", and replace with --itself;--

Claim 35:
    column 13, line 9:
        delete "thee", and replace with --three--

Signed and Sealed this

Fifth Day of May, 2009

JOHN DOLL
*Acting Director of the United States Patent and Trademark Office*